(12) United States Patent
Ellard et al.

(10) Patent No.: US 9,237,027 B2
(45) Date of Patent: Jan. 12, 2016

(54) DESTINATION ADDRESS CONTROL TO LIMIT UNAUTHORIZED COMMUNICATIONS

(71) Applicant: Raytheon BBN Technologies Corp., Cambridge, MA (US)

(72) Inventors: Daniel Joseph Ellard, Belmont, MA (US); Alden Warren Jackson, Brookline, MA (US); Christine Elaine Jones, Spokane Valley, WA (US); Josh Forrest Karlin, Stow, MA (US); Victoria Ursula Manfredi, Cambridge, MA (US); David Patrick Mankins, Cambridge, MA (US); William Timothy Strayer, West Newton, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 483 days.

(21) Appl. No.: 13/828,546

(22) Filed: Mar. 14, 2013

(65) Prior Publication Data

US 2015/0358285 A1   Dec. 10, 2015

Related U.S. Application Data

(60) Provisional application No. 61/613,704, filed on Mar. 21, 2012.

(51) Int. Cl.
*G06F 15/16* (2006.01)
*G06F 15/173* (2006.01)
*H04L 12/24* (2006.01)

(52) U.S. Cl.
CPC .................................... *H04L 12/24* (2013.01)

(58) Field of Classification Search
CPC ............ H04N 21/812; G06Q 30/0251; G06Q 30/0241; G06Q 30/0255; H04L 12/66; H04L 12/4641; H04L 61/1511; H04L 29/12066
See application file for complete search history.

(56) References Cited

U.S. PATENT DOCUMENTS

| | | | |
|---|---|---|---|
| 6,321,336 B1 * | 11/2001 | Applegate et al. | 726/11 |
| 6,453,419 B1 * | 9/2002 | Flint et al. | 726/3 |
| 2008/0072305 A1 * | 3/2008 | Casado et al. | 726/11 |
| 2010/0217837 A1 * | 8/2010 | Ansari et al. | 709/218 |
| 2012/0173727 A1 * | 7/2012 | Peng | 709/225 |

* cited by examiner

*Primary Examiner* — Peling Shaw
(74) *Attorney, Agent, or Firm* — Schwegman Lundberg & Woessner, P.A.

(57) ABSTRACT

Systems and methods for protecting a network including preventing data traffic from exiting the network unless a domain name request has been performed by a device attempting to transmit the data traffic. In an embodiment, a device within the protected network attempting to send data outside the protected network requests an address for a destination outside the protected network from a domain name server (DNS). In response, the DNS provides an address of the destination to the device and a gateway. In response to receiving the address, the gateway temporarily allows access to the address. In an embodiment, a DNS is coupled to a protected network and the gateway, the DNS provides an external address to a device in response to a request; and a mapping to the gateway; the gateway, coupled to a protected network and an external network, allows traffic according to the mapping.

20 Claims, 10 Drawing Sheets

US 9,237,027 B2

DESTINATION ADDRESS CONTROL TO LIMIT UNAUTHORIZED COMMUNICATIONS

CLAIM OF PRIORITY

This patent application claims the benefit of priority of Daniel Ellard, et al. U.S. Provisional Patent Application Ser. No. 61/613,704, titled "DESTINATION ADDRESS REWRITING TO BLOCK PEER-TO-PEER COMMUNICATIONS," filed on Mar. 21, 2012, which is hereby incorporated by reference herein in its entirety.

STATEMENT REGARDING FEDERALLY SPONSORED RESEARCH OR DEVELOPMENT

This invention was made with Government support under Government Contract Number is N66001-11-C-4017 awarded by the Defense Advanced Research Projects Agency (DARPA). The Government has certain rights in the invention.

CROSS-REFERENCE TO RELATED PATENT DOCUMENTS

This patent application is also related to Daniel Ellard, et al. U.S. patent application Ser. No. 13/828,427, titled "DESTINATION ADDRESS REWRITING TO BLOCK PEER-TO-PEER COMMUNICATIONS," filed on Mar. 14, 2013, which is hereby incorporated by reference herein in its entirety.

TECHNICAL FIELD

This document pertains generally, but not by way of limitation, to network communications. Embodiments pertain to communication networks, including internet protocol (IP) communication networks. Some embodiments relate to operations performed by a gateway separating a protected network and an external network.

BACKGROUND

There are many undesired network applications that can be difficult to block, such as peer-to-peer (P2P) network applications, TOR, BITTORRENT, and botnets. These applications may mask their traffic, change port and destination addresses, or masquerade as other protocols, making firewalls only a partial solution to the problem of preventing the application from performing undesired or unauthorized communications. Unauthorized communications may result in the unauthorized exfiltration of sensitive data or the infiltration of malware.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DESCRIPTION OF EXAMPLE EMBODIMENTS

Network enclaves desiring a high degree of protection, such as corporate and military networks, may need to be able to block certain types of unauthorized communications by undesired applications. Undesired applications may include peer-to-peer (P2P) applications or other malicious or promiscuous applications. Many undesired applications share a common property in that they do not perform name resolution lookups before connecting to peer applications. For example, P2P applications such as TOR, BITTORRENT, EMULE, etc., download lists of internet protocol (IP) addresses for potential peers. IP addresses may include Internet Protocol version four or version six addresses (IPv4 or IPv6), or other variations thereof. The P2P applications then attempt to connect directly to those destinations, without utilizing a name resolution lookup service, such as a domain name server (DNS).

Attempts to correlate name resolution lookups, or the lack thereof, with communications may be an insufficient solution as the results of name resolution lookups may be cached for long periods of time, making it difficult to keep track of legitimate applications that have cached an address and an unauthorized application that is attempting to directly access an unauthorized network location. Therefore, a need exists for systems and method to block unauthorized applications, such as P2P applications that do not perform name resolution lookups, without interfering with network activities of legitimate authorized applications.

Figure 1:
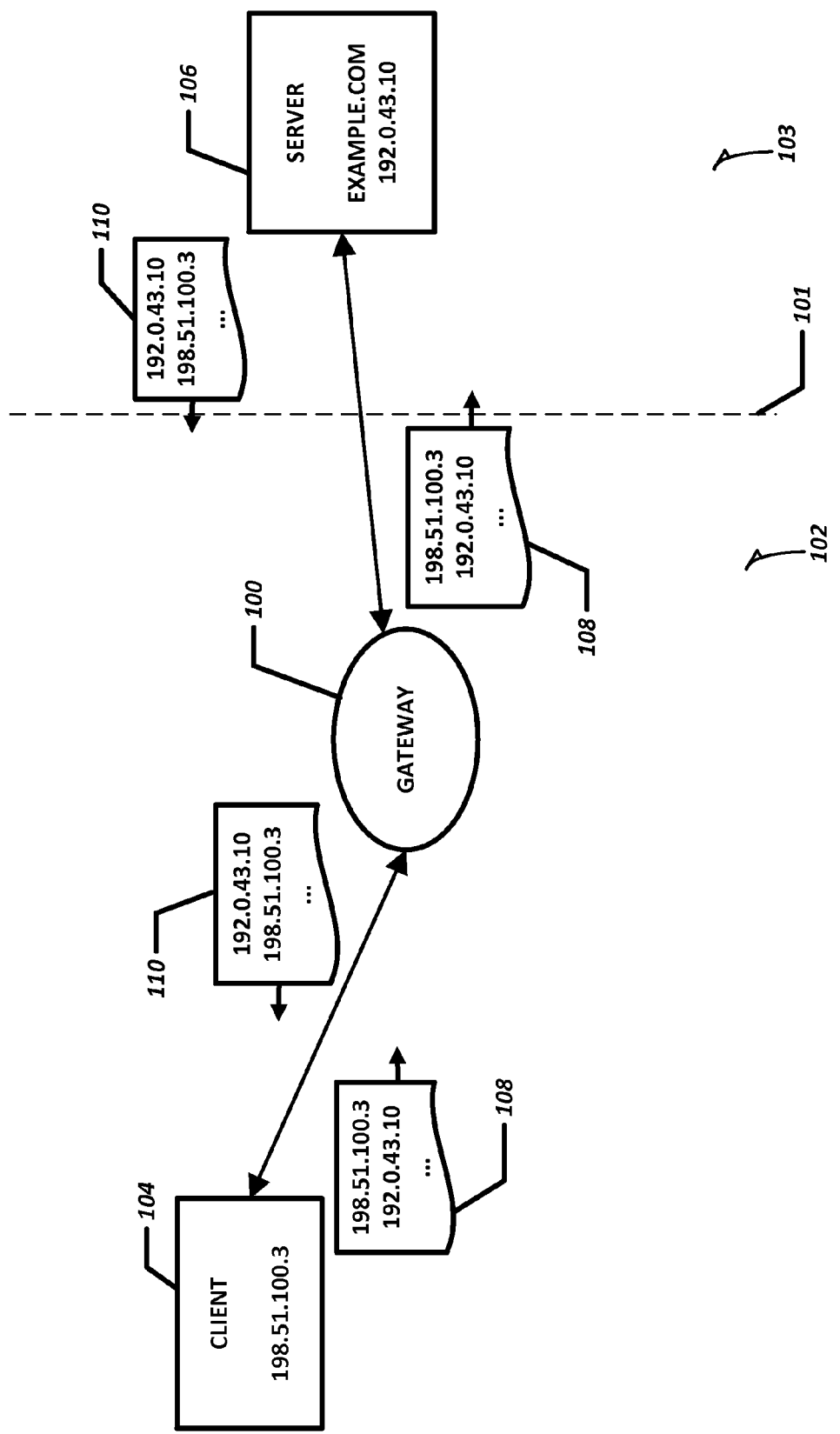
FIG. 1 is a block diagram illustrating routing network traffic through a gateway.

FIG. 1 is a block diagram illustrating routing network traffic through a gateway 100. The gateway 100 may include a router, switch, firewall, proxy or other network device that is configured to interface two or more networks. The gateway 100 may provide a boundary 101 between a local network 102 (e.g., a private home, business, or other intranet) and an external network 103 (e.g., a service provider network or the Internet). The gateway 100 may be implemented as a standalone network device, as a logical module in a computing device, as a component in a server, or any other device capable of being configured to interact with two or more networks.

A client device 104, such as a personal computer, laptop computer, tablet computer, smart phone, printing device, or other computing device capable of network communication, may communicate with server 106 (e.g., a server hosting a webpage at the domain EXAMPLE.COM) by transmitting a packet 108 (e.g., a data payload that includes routing information) to the gateway 100. The packet 108 may contain a destination address (e.g., IP address 192.0.43.10) of the server 106 and an origin address (e.g., IP address 198.51.100.3) of the client 104. The client device 104 may have been configured with the address of the server 106 or obtained the address by requesting a DNS lookup of a hostname (e.g., EXAMPLE.COM) assigned to the server 106. The gateway 100 forwards the packet 108 from the client device 104 to the server 106. In an example, the gateway 100 does not modify the packet.

In response to receiving packet 108, the server may generate a second packet 110 and send it to the client device 104. The gateway 100 may receive the second packet 110 from server 106 addressed to the client device 104. The gateway 100 may forward the second packet 110 to the client device 106. In an example, the gateway 100 may be configured with one or more rules to prevent or allow the client device 104 to access specific addresses included in the one or more rules. In an example, the client 104 may be prohibited from accessing any network addresses or resources outside the local network 102 (e.g., the external network 103) that are not indicated in the one or more rules as being allowed (e.g., the server 106 with address 192.0.43.10). This approach may prevent unauthorized network communications, but may be difficult or inefficient to maintain for scenarios involving multiple client devices that desire access to a variety of network resources outside the local network 102.

Figure 2:
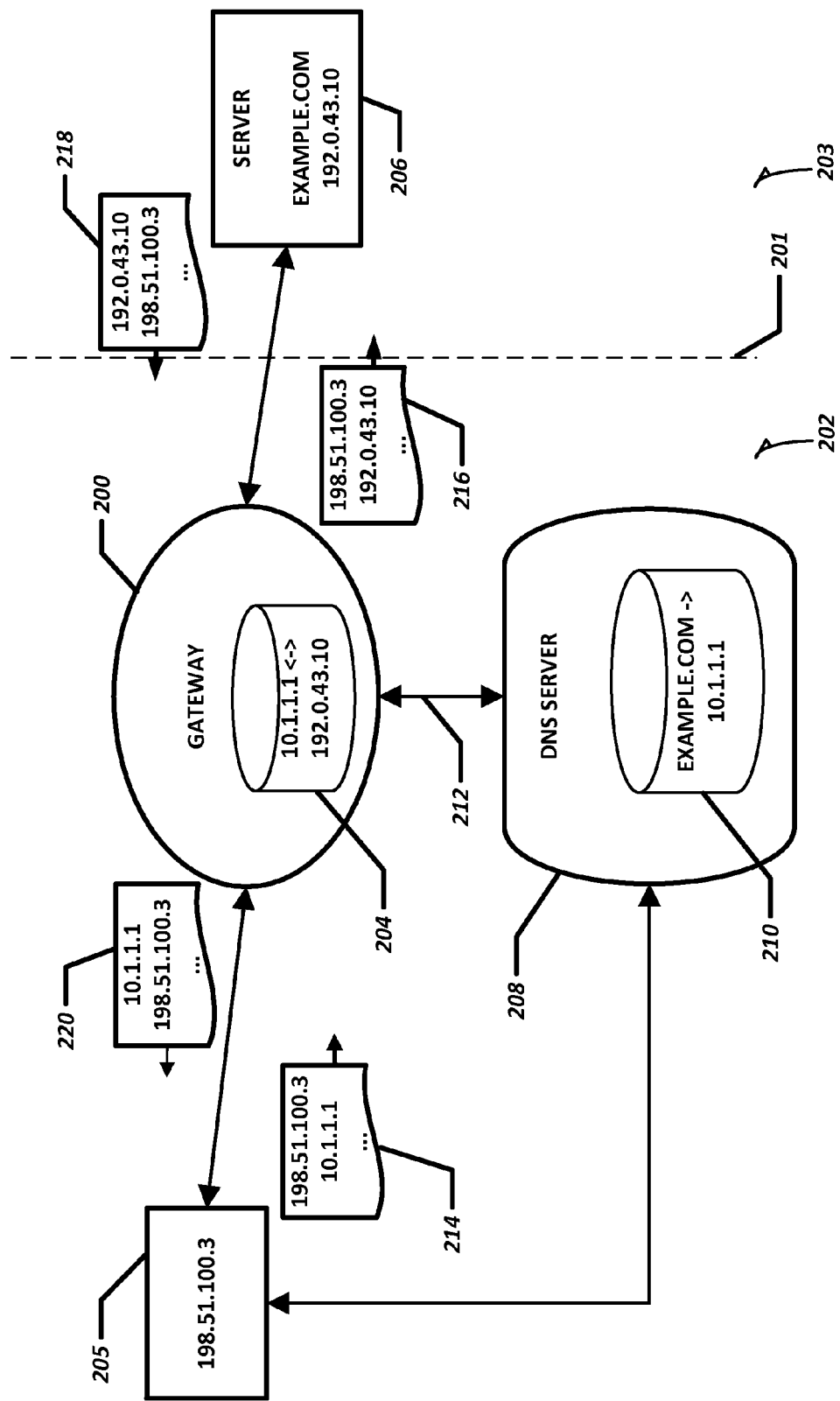
FIG. 2 is a block diagram illustrating a gateway providing a boundary between a protected network and an external network, in accordance with some embodiments.

FIG. 2 is a block diagram illustrating a gateway 200 providing a boundary 201 between a protected network 202 and an external network 203 (e.g., the Internet), in accordance with some embodiments. The gateway 200 may be a network interface device configured to route data between two or more networks. The gateway 200 may store a mapping between internal addresses used within the protected network 202 and external addresses that are part of the external network 203 in a data store 204 such as a database, lookup table, or other data structure. The data store 204 may be maintained in a volatile or non-volatile memory device included in gateway 200.

A device 205 that is part of the protected network 202 may attempt to access a network resource with hostname of EXAMPLE.COM. The hostname of EXAMPLE.COM may be assigned to a server 206 that has an IP address of 192.0.43.10. The device 205 may attempt to request the IP address of server 206 by providing the hostname of EXAMPLE.COM to a DNS server 208 located within the protected network 202. In an example, all attempts to send a DNS lookup request to a server outside of the protected network 202 may be blocked by the gateway 200.

In an example where the DNS server 208 does not have an IP address corresponding to the requested hostname the DNS server 208 may transmit a lookup request to the gateway 200. In response to the lookup request the gateway 200 may query a public DNS server for the requested hostname. The public DNS server may provide the IP address assigned to the requested hostname (e.g., EXAMPLE.COM corresponds to 192.0.43.10). The gateway 200 may then generate an internal address (e.g., 10.1.1.1) that is mapped to the IP address (e.g., 192.0.43.10) assigned to the requested hostname (e.g., 10.1.1.1 corresponds to 192.0.43.10). The gateway 200 may then provide the internal address to the DNS server 208. In response to the request for the IP address of server 206 the DNS server 208 may deliver the internal address corresponding to the server 206 to the device 205. In this manner the DNS server 208 may provide devices, such as device 205, with a mapped internal address for a network resource external to the protected network 202 in response to lookup requests.

In an example, the DNS server 208 may include a data store 210 such as a database, lookup table, or other data structure, to store the mapping between the requested hostname and the internal address (e.g., EXAMPLE.COM corresponds to 10.1.1.1). The data store 210 may be maintained in a volatile or non-volatile memory device included in the DNS server 208. The DNS server 208 and the gateway 200 may be coupled by a link 212 to exchange and update mappings.

In an example, DNS queries by device 205 to an eternal DNS server (e.g., any DNS server outside the protected network) may be allowed, but any response from the external DNS server may be rewritten by gateway 200 when they return such that the responses that reach the device 205 are equivalent to the responses that device 205 would have received from the local DNS server 210.

In an example, the gateway 200 may rewrite destination addresses of all packets exiting the protected network based on the mapping. The gateway 200 may also rewrite source addresses of packets entering the protected network 202. In this manner, the gateway 200 may be configured to implement a method for blocking peer-to-peer communications that includes performing translation (e.g., rewriting) of destination IP addresses of in packets of network traffic. The gateway 200 may include a translation mechanism disposed between protected network 202 and an external network 203. In an example, the translation mechanism may rewrite the destination address of all network communication (e.g., packets) exiting the protected network 202 and the source address of all network communications entering the protected network 202 from the external network 203.

In an example, the device 205, which may be assigned IP address 198.51.100.3 in the protected network 202, may generate a first packet 214 addressed to the server 206 with the IP address of 10.1.1.1 that the device 205 received from the DNS server 208. The gateway 200 may receive the first packet 214 and replace the destination address of 10.1.1.1 with the actual address 192.0.43.10 of the server 206, thereby generating a second packet 216 that may be properly routed through the external network 203 to the server 206.

In an example embodiment, attempts by device 205 to use the actual IP address of server 206 (e.g., 192.0.43.10) are detected and blocked at the gateway 200. The gateway 200 may log such an attempt to use the actual IP address as a failed lookup mapping because the destination of the packet did not include a valid internal address for the protected network 202.

The server 206 may respond to receiving the second packet 216 by generating a first reply-packet 218 that includes a destination address of the device 205 (198.51.100.3) and an origin address of the server 206 (e.g., 192.0.43.10). The first reply-packet 218 may be routed through the external network 203 to the gateway 200. The gateway 200 may perform a lookup operation to determine if the origin address of the server 206 is mapped to an internal address for the protected network 202. In response to a successful lookup (e.g., an existing mapping is found in the data store 204), the gateway 200 may replace the origin address of the server 206 with the internal address that is mapped to the origin address (e.g., 10.1.1.1). In an example embodiment, gateway 200 may include a stateless router configured to perform an address translation operation on all incoming and outgoing packets according to the mapping(s) in the data store 204.

In an example embodiment, the gateway 200 may block any attempt by a device in the protected network 202 (e.g., an unauthorized communication attempt by a peer-to-peer application on device 205) to access an address outside of the protected network 202 that was not the result of a DNS lookup request to DNS server 208. Additionally, gateway 200 may block by all DNS queries (e.g., a name resolution lookup request) to any DNS server, other than a request made within the protected network 202 to the DNS server 208.

Figure 3:
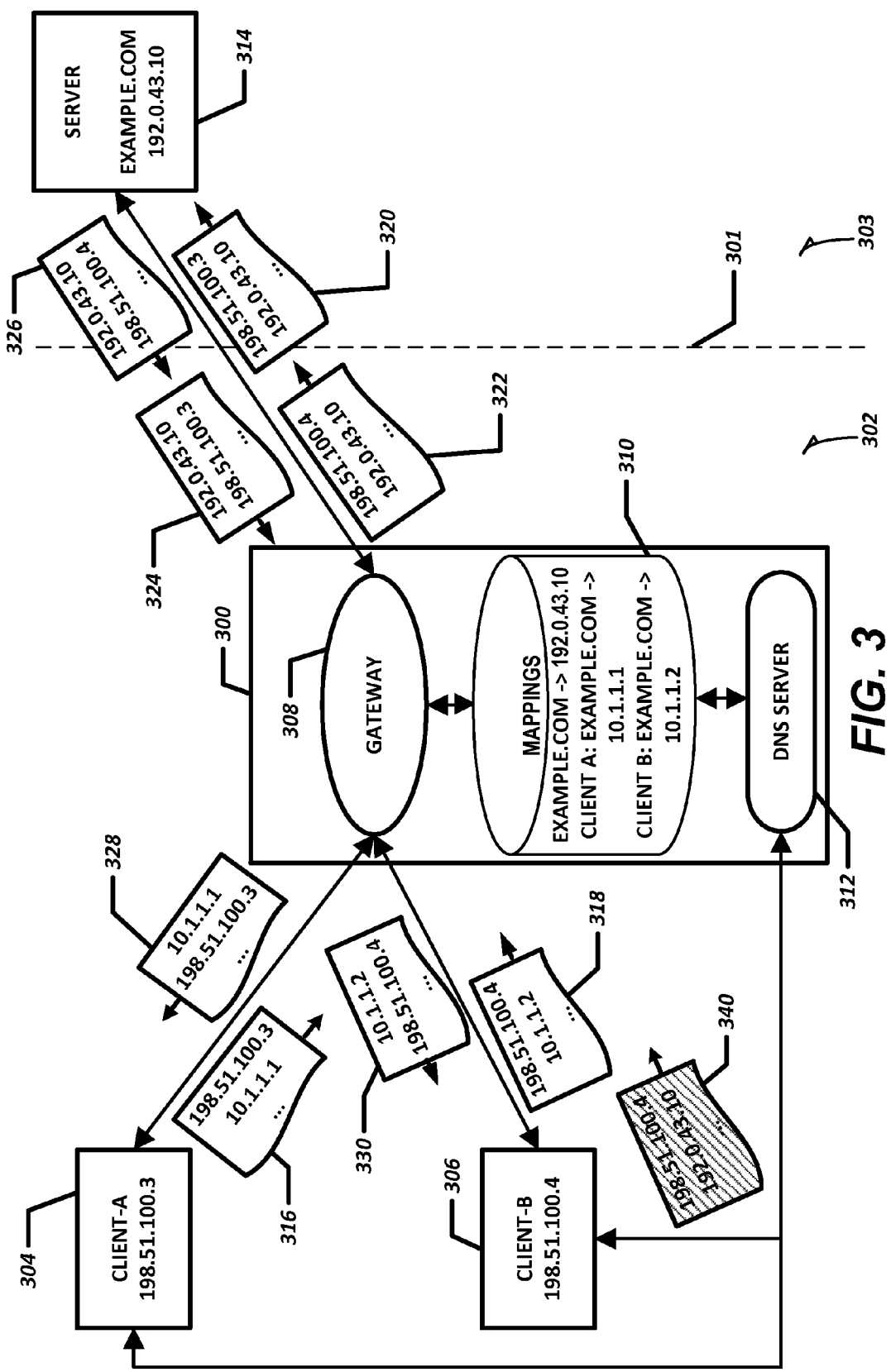
FIG. 3 is a block diagram illustrating a gateway-DNS establishing a protected network for multiple devices, in accordance with some embodiments.

FIG. 3 is a block diagram illustrating a gateway-DNS 300 establishing a protected network 302 for multiple devices, in accordance with some embodiments. The gateway-DNS 300 may provide a boundary 301 between a protected network 302 that includes network devices client-A 304 and client-B 306, and an external network 303 (e.g., the Internet). In an example, the gateway-DNS 300 may provide different local address mappings destination to different clients for a single network resource in an external network. In an example, the gateway-DNS 300 may perform network address translation (NAT) for data traffic (e.g., packets) crossing the boundary 301.

In an example, the gateway-DNS 300 may include a gateway router 308, a mapping store 310, and a local DNS server 312. The gateway router 308 and the local DNS server 312 may both be coupled to the mapping store 310 such that any change in a mapping may be immediately available to both the gateway router 308 and the local DNS server 312. The gateway-DNS 300 may provide devices, such as client-A 304 and client-B 306, within the protected network 302 with a portal to the external network 303. The devices within the protected network 302, such as client-A 304 and client-B 306, may be otherwise prevented from accessing the external network 303, or any other device outside of protected network 302 that could act as a bridge or connection to the external network. The devices within the protected network 302, such as client-A 304 and client-B 306, may communicate directly with each other, for example, without being required to use gateway 308.

The gateway-DNS 300 may create and maintain mappings between one or more internal addresses used within the protected network 302, and one or more corresponding external addresses that identify network resources that are part of the external network 303. The mapping store 310 may include a data store such as a database, a lookup table, or other data structure maintained in a volatile or non-volatile memory device included in the gateway-DNS 300. The mappings in the mapping store 310 may be different for each client within the protected network. Devices that perform DNS lookups by requesting the resolution of an address from the local DNS server 312 may be given the mapped address for the requested destination. In some embodiments, devices that attempt to use an IP address that is not included in the mapping store 310 may have their communication attempts blocked.

In an example, the DNS server 312 may include a stateless DNS server configured to either alter incoming DNS responses from local network devices in the protected network 302, or perform address mapping and translation of DNS responses from an external DNS server (not shown).

In an example, client-A 304 and client-B 306 are provided different (e.g., unique) destination addresses by the gateway-DNS 300 for an external server 314. The external server 314 may be assigned the hostname EXAMPLE.COM, which is mapped to a real destination address of 192.0.43.10. A request by client-A 304 for the address of EXAMPLE.COM may be made to the DNS server 312 of the gateway-DNS 300, which may respond with an internal address of 10.1.1.1. A request by client-B 306 for the address of EXAMPLE.COM may be made to the DNS server 312 of the gateway-DNS 300, which may respond with an internal address of 10.1.1.2. These mappings may be stored in the mapping store 310.

Accordingly, client-A 304 may transmit a first packet-A 316 to the gateway 308 with a source address of 198.51.100.3 and a destination address of 10.1.1.1, and client-B 306 may transmit a first packet-B 318 to the gateway 308 with a source address of 198.51.100.4 and a destination address of 10.1.1.2. The gateway 308, upon receipt of the first packet-A 316 may reference the mapping store 310 and replace the destination address of 10.1.1.1 with address 192.0.43.10, thereby generating second packet-A 320 that may be routed to the server 314. The gateway 308, upon receipt of the first packet-B 318 may reference the mapping store 310 and also replace the destination address of 10.1.1.2 with address 192.0.43.10, thereby generating second packet-B 322 that may be routed to server 314.

In response to receiving the second packet-A 320 the server 314 may generate a reply-A packet 324 addressed to client-A 304. In response to receiving the second packet-B 322 the server 314 may generate a reply-B packet 326 addressed to client-B 306. The gateway 308 may receive reply-A packet 324 addressed to client-A 304, access mapping store 310 to retrieve the local address that corresponds to server 314 for client-A 304, and replace the origin address of server 314 with the local address (e.g., 10.1.1.1). The local packet-A 328 with the translated origin address may then be routed to client-A 304. Similarly, the gateway 308 may receive reply-B packet 326 addressed to client-B 306, access mapping store 310 to retrieve the local address that corresponds to server 314 for client-B 306, and replace the origin address of the server 314 with the local address (e.g., 10.1.1.2). The local packet-B 330 with the translated origin address may then be routed to client-B 306. In this manner, a solution to the otherwise difficult problem of preventing unauthorized network activity without the need for deep packet inspection (DPI), proxies, or a man-in-the-middle box to inspect and determine the legitimacy of all network traffic may be provided.

In an example, access to an external DNS need not be blocked, proxied, or rewritten at the gateway-DNS 300. If a device accesses an external DNS server (e.g., any DNS server that is not controlled or coupled to the gateway-DNS 300 within the protected network 302), then any responses to the DNS queries sent to the external DNS server may be unusable within the protected network 302. A device attempting to use external addresses may have address in communication packets using the external addresses rewritten by the gateway 308 if an external address coincidentally is mapped to a local address, or the communication packets may be dropped entirely, and then fail to arrive at their intended external destination.

Preventing an application operating on the device Client-A 304 within the protected network 302 from knowing the true destination address can also act to defeat protocols that use a known destination address as part of a higher-level protocol that is not authorized or known to the gateway-DNS 308. For example, if the application believes that it is connecting to a server 314 with the address 10.1.1.1, the application may send a challenge to the server 314, asking the server 314 to confirm its identity. If the server 314 has a real address of 192.0.43.10, then server 314 will be unable to confirm that its address is 10.1.1.1. Additionally, the server 314 will be unaware that the application believes that the server 314 is at address 10.1.1.1, and the protocol will fail.

Destination IP address rewriting as described herein may be utilized within the protected network 302 to block the operation of undesired applications from operating with the protected network. Because these undesired applications may attempt to use of direct IP addresses to access peer devices in the external network 303, embodiments disclosed herein may prevent undesired applications on client devices within the protected network 302 from connecting directly with those peer devices in the external network 303.

In an example, an authorized protocol may attempt to send a packet 340 from Client-B 306 to server 314 without the use of a locally mapped address. For example, the unauthorized protocol may construct packet 340 with the actual address (192.0.43.10) of server 314. Upon receipt of packet 340 by the gateway 308 the packet 340 is dropped and not allowed to exit the protected network 302. As illustrated in FIG. 3, the client-B 306 cannot access address 192.0.43.10 directly, and must, for example, resolve EXAMPLE.COM using the DNS server 312 to obtain the local address for server 314 (10.1.1.1). Packets that are addressed to unknown addresses in the external network 303 or the protected network 302 are dropped by the gateway 308. The DNS server 312 may provide local destination addresses to local clients and gateway 308 such that the gateway 308 may translate the local addresses into real-world addresses that may be used outside of the protected network 308. In an example, source-address rewriting may also be performed by the gateway 308 in order to mask the topology of the protected network 302 from view by a device in the external network 303.

Figure 4:
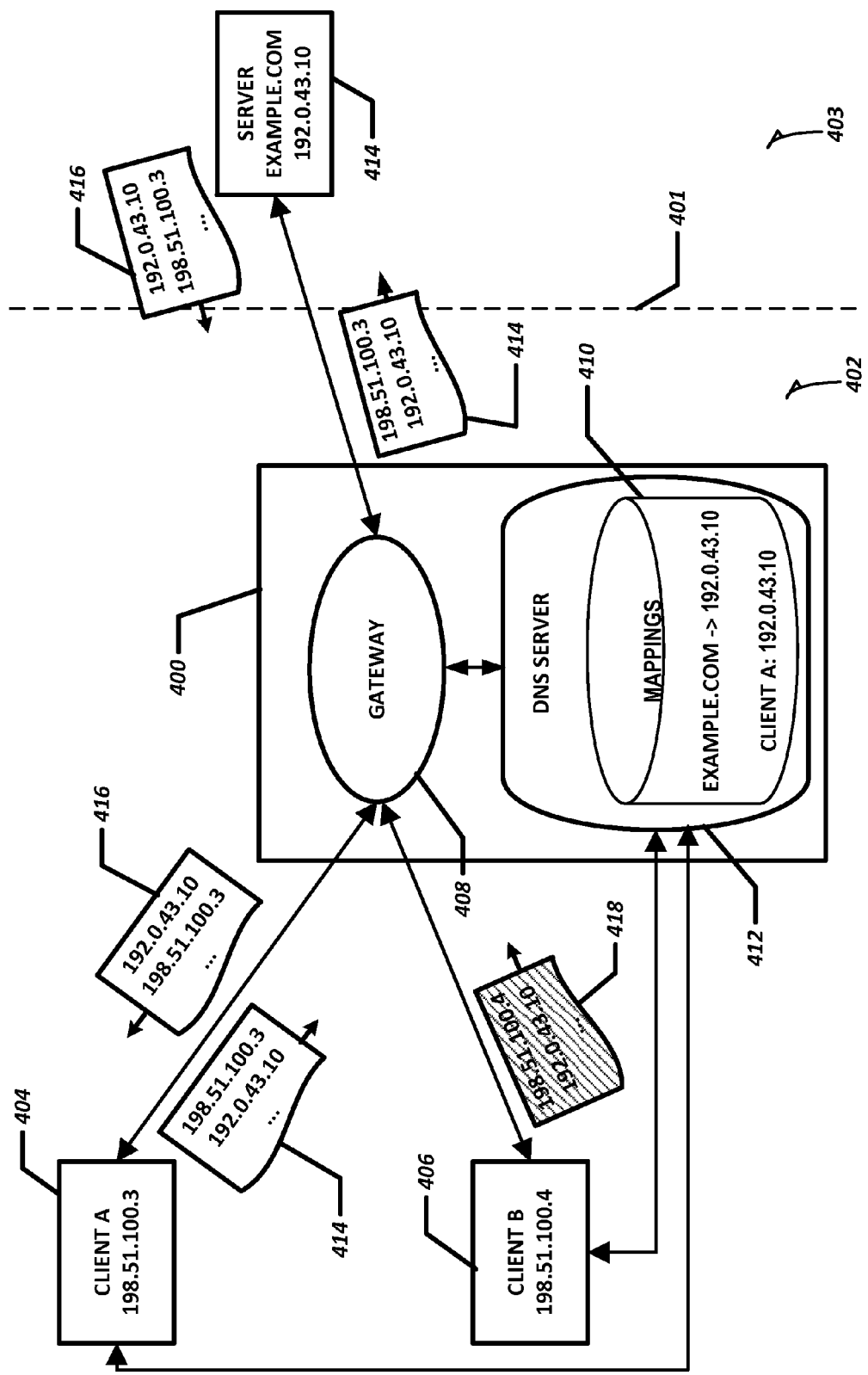
FIG. 4 is a block diagram illustrating the operation of an example destination-network gateway, in accordance with some embodiments.

FIG. 4 is a block diagram illustrating the operation of an example destination-network gateway 400, in accordance with some embodiments. The destination-network gateway 400 may provide a boundary 401 between a protected network 402 and an external network 403 (e.g., the Internet). The protected network 402 may include a plurality of network devices, such as client-A 404 and client-B 406. The destination-network gateway 400 may prevent data traffic (e.g., packets) from crossing the boundary 401 unless an individual local network device has performed a DNS lookup with destination-network gateway 400.

The destination-network gateway 400 may include a gateway 408 that can route data traffic between the protected network 402 and the external network 403 according to mappings 410 maintained by a local DNS server 412. The destination-network gateway 400 may block all DNS queries at the gateway 408 that are not directed to DNS server 412. DNS server 412 will therefore be able to maintain a mapping of each network device that has requested access to an address in the external network 403, and provide the gateway 408 with a list of which network devices may access specific resources outside of the protected network 402.

An advantage to blocking addresses that have not been provided in response to a request to the DNS server 412 is that if a network device attempts to use an address that was not the result of a DNS lookup serviced by the DNS server 412, then the address may be easily blocked by the gateway 408. In this manner, all authorized traffic may be centrally managed by configuring the DNS server 412 with a white-list of allowed addresses in the external network 403, a black-list of prohibited addresses, hostnames, or domains in the external network 403, or a combination of white and black lists. In an example, network devices with the protected network 402 may be authorized to access the external network 403 as long as the access is proceeded with a DNS lookup request to the DNS server 412.

In an example, a host may be configured to learn its configuration is to use a configuration protocol, (e.g., dynamic host configuration protocol (DHCP) or a similar protocol) to discover the address of a local DNS server and local network gateway. A DHCP server may be configured to provide the necessary information to hosts on the network without either the user or the system administrator involved. In an example where a user has misconfigured a network device within the protected network 402 to use a DNS lookup server other than DNS server 412, the user will quickly realize that something is misconfigured on their network device because no DNS lookups will succeed, and the user must either ask their local system administrator for the correct settings to utilize DNS server 412 in order to access the external network 403. Similarly, any unauthorized applications or protocols that attempt to access an address outside in the external network 403, without first performing a DNS request with the DNS server 412, will be blocked by gateway 408. In another example, all DNS queries originating within the protected network 402 that are addressed to any DNS server may be redirected to the local DNS server 412. In yet another example, the gateway 408 may allow DNS queries originating within the protected network 402 to egress the enclave, but any DNS responses originating from the external network 403 may be blocked.

Figure 5:
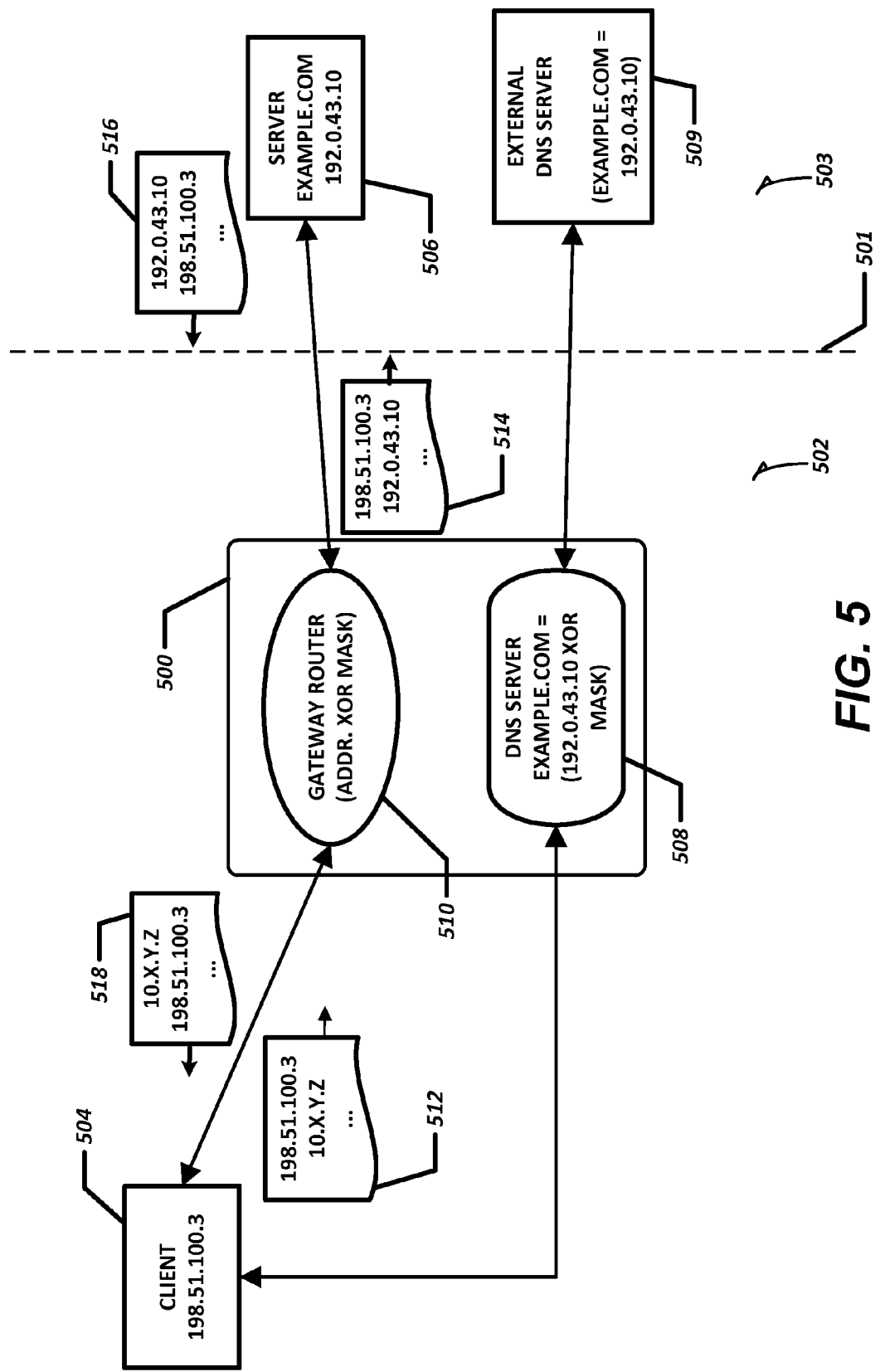
FIG. 5 is a block diagram illustrating logical masking of addresses, in accordance with some embodiments.

FIG. 5 is a block diagram illustrating logical masking of addresses, in accordance with some embodiments. The gateway 500 may provide a boundary 501 between a protected network 502 and an external network 503 (e.g., the Internet). The protected network 502 may include one or more network devices, such as client 504. The gateway 500 may translate the destination and origin addresses for all data traffic (e.g., packets) exiting the protected network 502 and entering the protected network 502, respectively. The translation may, for example, include performing a logical operation such as an exclusive-OR (XOR) on the appropriate address with a mask value, and utilizing the resulting value as an internal address. The logical operation and the mask value may be known to both a local DNS server 508 and a gateway router 510 included in the gateway 500.

In an example, client 504 may attempt to access a server 506 that is assigned the hostname EXAMPLE.COM. The client 504 may request that the local DNS server 508 resolve the hostname EXAMPLE.COM and provide an actual address to access the server 506. In response to the request, the DNS server 508 may look up the actual address for the hostname EXAMPLE.COM by accessing an external DNS server 509 to obtain the actual address (e.g., 192.0.43.10) to access the server 506 in the external network 503. The DNS server 508 may then perform the logical operation applying the mask value to the actual address. The result of the logical operation (e.g., 10.X.Y.Z) may be provided, in response to the request, to the client 504 as a local address with the protected network 502 for the server 506.

The client 504 may construct an egress packet 512 directed to server 506 and including a source address (198.51.100.3) and a destination address (10.X.Y.Z). The packet 512 is intercepted by the gateway router 510 before it exits the protected network 502. The gateway router 510 may perform the logical operation, or its logical reverse equivalent if appropriate, applying the mask value to the destination address to obtain the actual address (192.0.43.10) for the server 506. The actual address may be inserted into the packet 512 resulting in a translated egress packet 514 that may be routed to the server 506.

In response to receiving the egress packet 514, which may contain a data request such as for a file, a web page, or other information, the server may generate an ingress packet 516 address to the client 504 and including the actual address of the server 506. Upon receipt of the ingress packet 516 the gateway router 510 may perform the logical operation applying the mask value to the actual address of the server 506, and producing a translated ingress packet 518. In this manner the actual address of the server 506 may be hidden from the client 504, thereby preventing an unauthorized application from directly accessing network resources outside of the protected network through the use of a predetermined network address.

Figure 6:
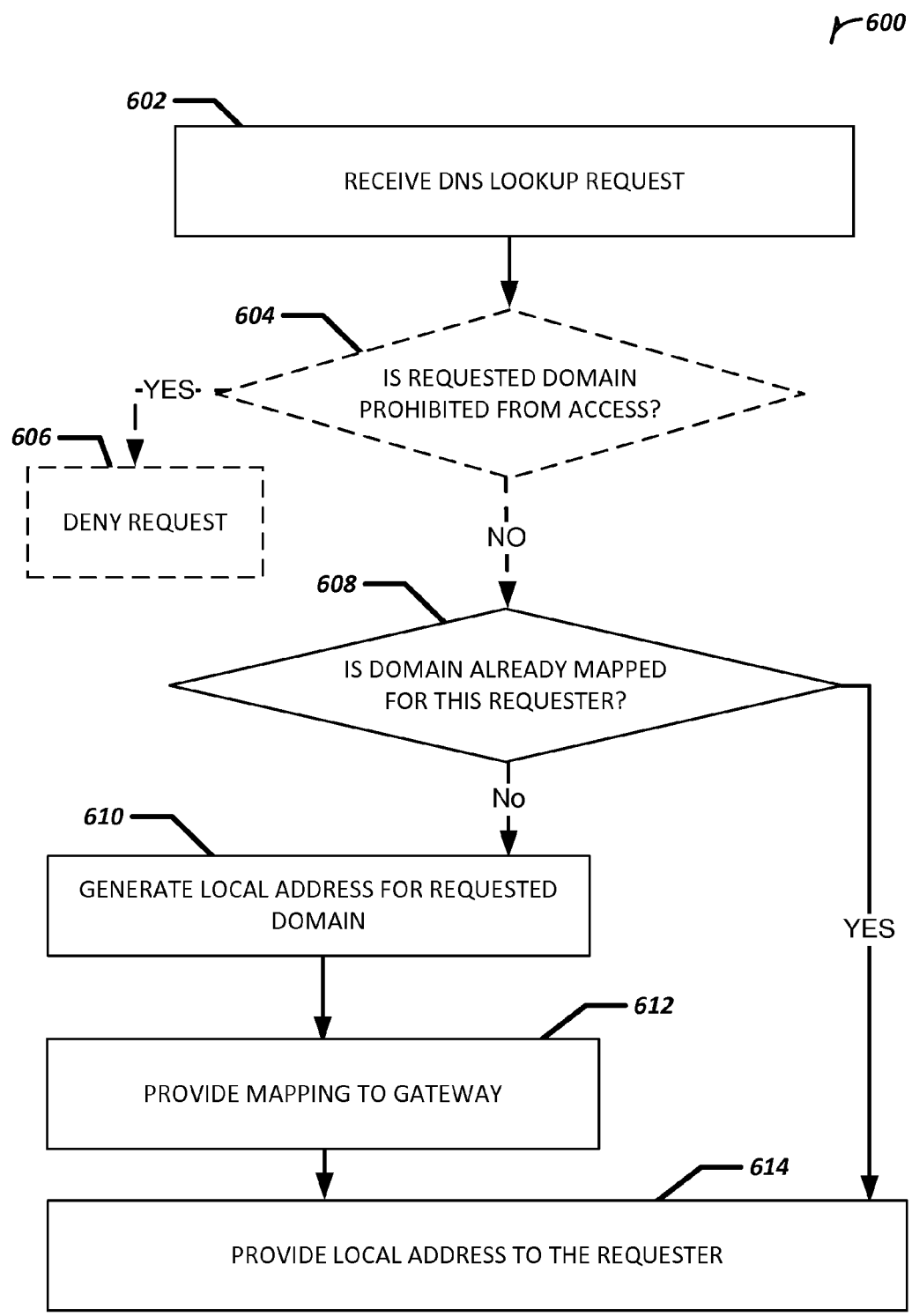
FIG. 6 is a flow chart illustrating an example method for providing a protected network with local domain name resolution, in accordance with some embodiments.

FIG. 6 is a flow chart illustrating an example method 600 for providing a protected network with local domain name resolution, in accordance with some embodiments. The example method 600 may be implemented in the DNS server 208 of FIG. 2 or the local DNS server 312 of FIG. 3. In general, all attempts to egress the protected network are blocked. For example, a gateway router, coupled to the protected network and an external network, may be configured with a policy to block all traffic from the protected network that attempts to reach the external network. The gateway router may be configured to receive notifications indicating that a temporary exception to the policy may be allowed. For example, an exception may indicate that an individual device may be authorized to access an address of a resource in the external network.

At 602, a domain name server may receive a DNS lookup request. For example, all devices within the protected network may be configured to transmit a request to the domain name server with the domain name of any resources outside the protected network that the devices wish to access. In an example, the individual device may request that the domain-name server provide an IP address for the hostname EXAMPLE.COM.

At 604, the domain-name server may optionally check to determine if the requested domain is prohibited from access. For example, the protected network may include a black-list of domains that devices within the protected network are prohibited from accessing. At 606, in response to a determination at 604 that the domain is prohibited, the request is denied. For example, a response to the request may not be sent. A log entry indicating that an attempt was made to access a prohibited domain made be made by the domain name server.

At 608, the domain name server may check to determine if the requested domain was previously mapped for the requesting device. If a mapping already exists for the requested domain, then, at 614, the local address for the requested domain is provided to the requesting device.

At 610, in response to a hostname being determined to have not been previously mapped at 608, the domain name sever may generate a local address for the requested hostname. For example, if a device requests the address of EXAMPLE.COM, the domain name server may determine that an actual address of EXAMPLE.COM is 192.0.43.10 and generate a local address, such as 10.1.1.1, that is mapped to 192.0.43.10.

At 612, the domain name sever may provide the mapping to the gateway. In the scenario where the mapping indicates that the address 192.0.43.10 is mapped to 10.1.1.1 both addresses are provided to the gateway. In an example, the mapping may include an expiration time or a value indicating a period of time during which the mapping will be valid. The expiration time or the value may be a predetermined value configured in the domain name server (e.g., twenty minutes, one hour, or twenty-four hours). In an example, the address of the requesting device may also be provided to the gateway.

At 614, the local address for the requested hostname is provided to the requesting device. In an example, the actual address of the hostname is not provided to the requesting device. In an example, the expiration time or the value indicating the period of time during which the mapping will be valid may also be provided to the requesting device along with the local address.

Figure 7:
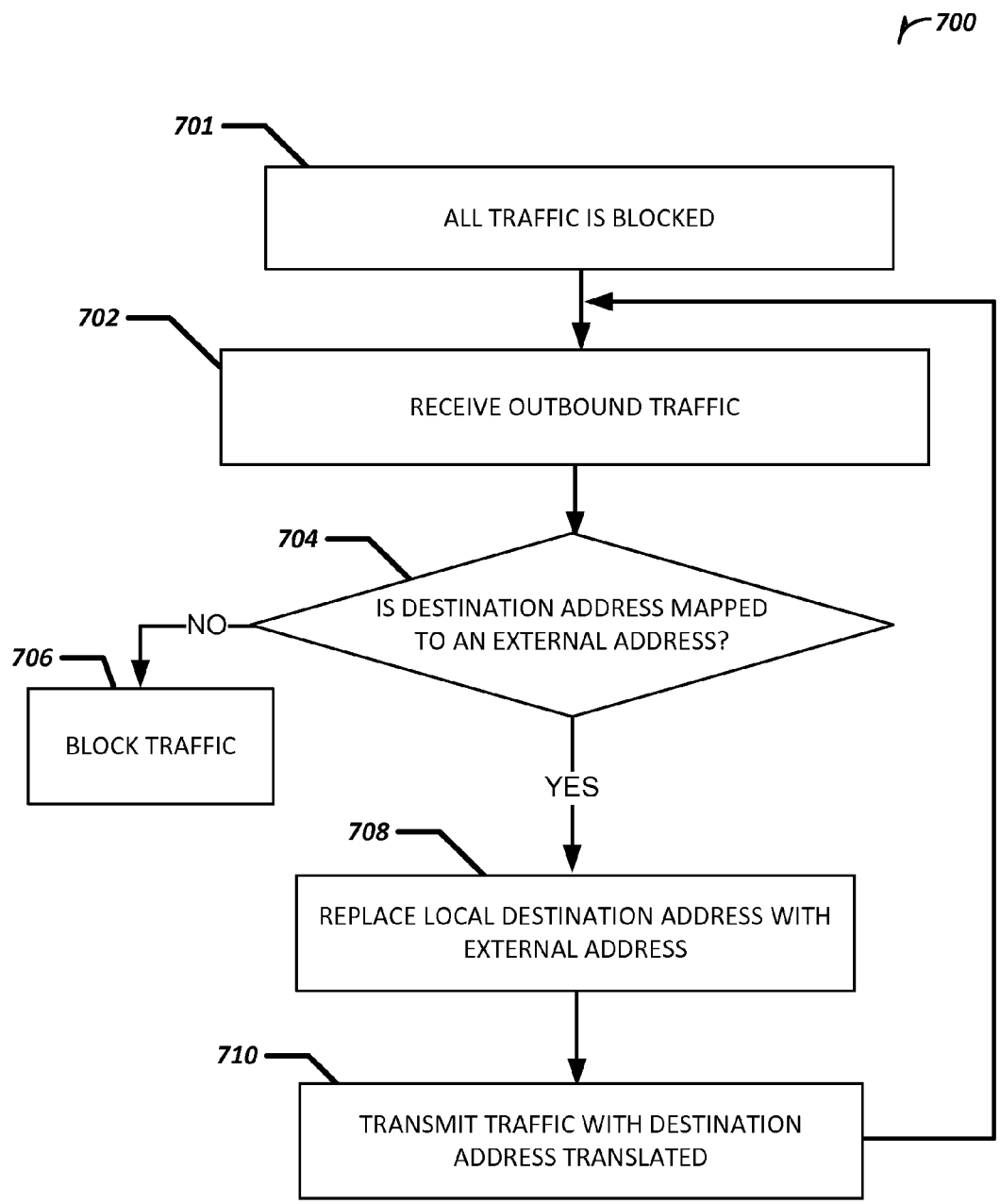
FIG. 7 is a flow chart illustrating an example method for translating addresses of outbound network traffic, in accordance with some embodiments.

FIG. 7 is a flow chart illustrating an example method 700 for translating addresses of outbound network traffic, in accordance with some embodiments. At 701, all outbound network traffic attempting to egress the protected network may be blocked. For example, a gateway router, coupled to the protected network and an external network, may be configured with a policy to block all traffic from the protected network that attempts to reach the external network. The gateway router may be configured to receive notifications indicating that a temporary exception to the policy may be allowed (e.g., a mapping between a local address and an external address). For example, an exception may indicate that an individual device may be authorized to access an address of a resource in the external network. In an example embodiment, the notifications indicating that a temporary exception to the policy is allowed may be received from a domain name server. In an example, the domain name server may include an implementation of method 600.

At 702, outbound traffic may be received. The outbound traffic may originate from any device within the protected network. For example, the gateway router may receive a data packet from the individual device addressed to a resource outside the protected network.

At 704, a determination as to whether a local destination-address of the outbound traffic is mapped to an external address. For example, the determination may include a comparison of the destination address in the packet with any If the local destination-address is not included in a mapping to an external address, then, at 706, the outbound traffic is blocked. For example, the data packet from the individual device may be addressed to an actual address outside the protected network, which would result in the packet being dropped by the gateway.

At 708, in response to the destination address of the outbound traffic being mapped to an external address, the local destination address is replaced with the external address. At 710, the outbound traffic is transmitted with the destination address translated to be the actual external address.

Figure 8:
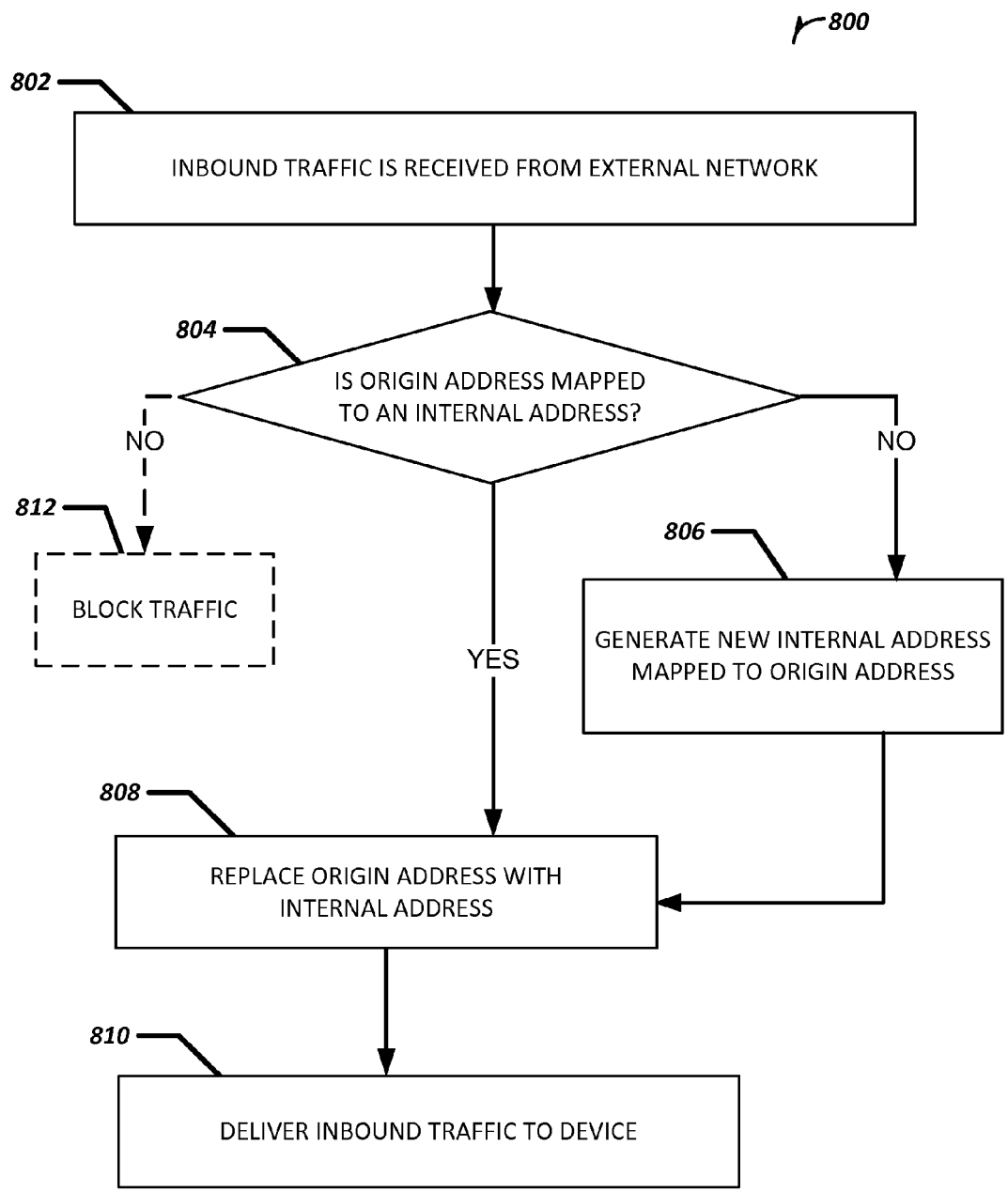
FIG. 8 is a flow chart illustrating an example method for translating addresses of inbound network traffic, in accordance with some embodiments.

FIG. 8 is a flow chart illustrating an example method 800 for translating addresses of inbound network traffic, in accordance with some embodiments. The example method 800 may be used in conjunction with the example method 700 of FIG. 7 in a bi-directional gateway such as the gateway 200 of FIG. 2 or the gateway-DNS 300 of FIG. 3.

At 802, inbound traffic is received from an external network. For example, a gateway router may be configured to serve as a gateway between a protected network and an external network (e.g., the Internet) such that all network traffic attempting to enter the protected network is processed by the gateway router.

At 804, a check is performed to determine if an origin address of the inbound traffic is mapped to an internal address in the protected network. The check may be performed on a packet-by-packet basis.

In an embodiment, if the origin address is not mapped to an internal address, at 806, a new internal address is generated and mapped to the origin address. In an alternative embodiment, if the origin address is not mapped to an internal address, at 812 the traffic is blocked. In another embodiment (not depicted) an additional check may be made to determine if the origin address is included on a white-list of allowed addresses or a black-list of prohibited addresses, and mapped or blocked, respectively.

At 808, the origin address is replaced with the internal address in response to a determination that the origin address is mapped to an internal address in the protected network. For example, as depicted in FIG. 2, if an incoming data packet is addressed with a destination address of a client device (e.g., 198.51.100.3) and an origin address of a server (e.g., 192.0.43.10). The gateway replaces the origin address of the server with the internal address that is mapped to the origin address (e.g., 10.1.1.1). At 810, the inbound traffic is delivered to the client device as indicated in a destination address of the inbound traffic.

Figure 9A:
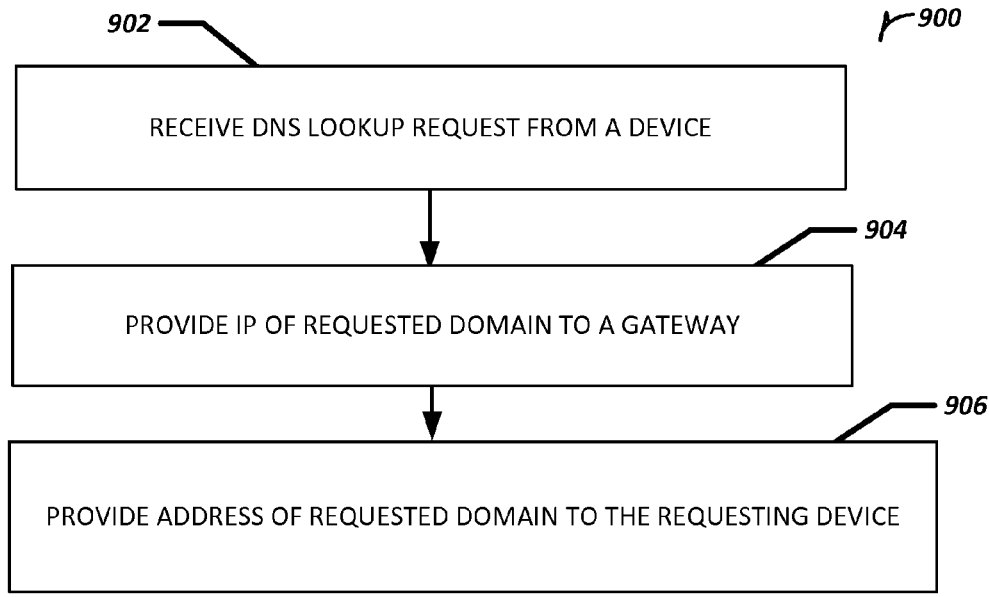
FIG. 9A is a flow chart illustrating an example method for providing a protected network with local domain name resolution, in accordance with some embodiments.

FIG. 9A is a flow chart illustrating an example method 900 for providing a protected network with local domain name resolution, in accordance with some embodiments.

At 902, a domain name lookup request is received. For example, a local DNS server may be configured to supply requesting devices within a protected network the addresses of domains that are outside of the protected network.

At 904, the address of the domain is provided to a gateway in the protected network. For example, in response to the domain name lookup request, the local DNS server may provide (e.g., transmit over a network, or place in a shared memory location) the address of the domain that was requested by a device within the protected network. The gateway may add the address of the domain to a whitelist indicated future access to the domain may be allowed. In an example, the local DNS server may also provide the address of the device that made the request to the gateway. The gateway may add the address of the device that made the request to the whitelist for the domain, thereby indicating that only that specific device may access the address of the domain.

At 906, the address of the requested domain is provided to the device that made the request. The address may include an expiration time or valid-until value that indicates an amount of time that the address may be valid for. The expiration time or valid-until value may also be provided to the gateway, at 904, such that the DNS server and the gateway may coordinate the expiration of the address.

Figure 9B:
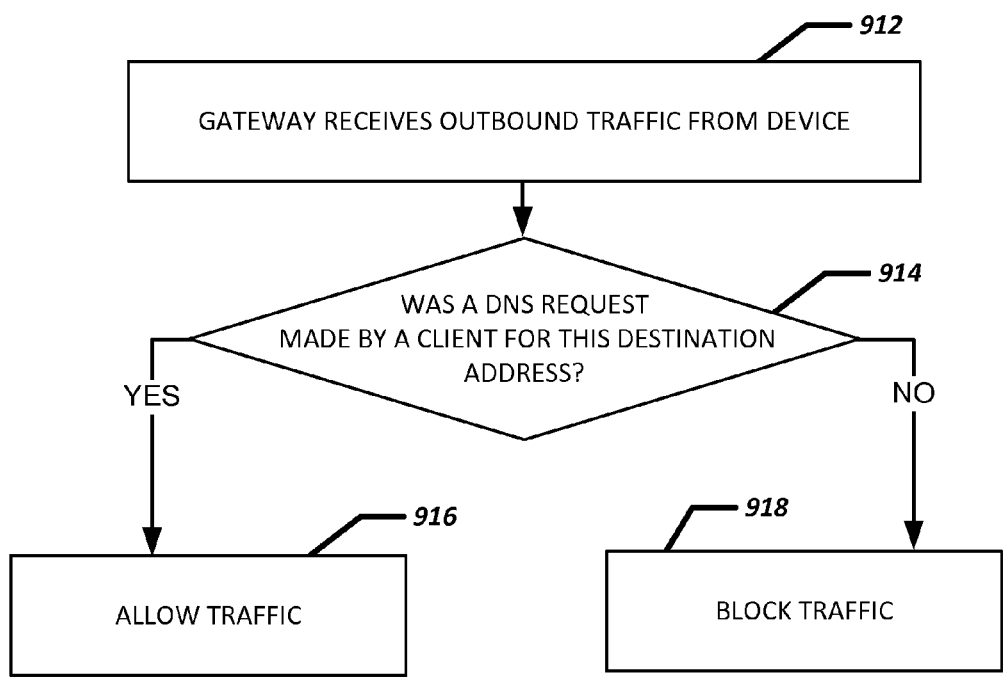
FIG. 9B is a flow chart illustrating an example method for limiting unauthorized communications, in accordance with some embodiments.

FIG. 9B is a flow chart illustrating an example method 910 for limiting unauthorized communications, in accordance with some embodiments. For example, a gateway router, coupled to a protected network and an external network, may be configured with a policy to block all traffic from the protected network that attempts to reach the external network. The gateway router may be configured to receive notifications indicating that a temporary exception to the policy may be allowed. For example, an exception may indicate that an individual device may be authorized to access an address of a resource in the external network.

At 912, a gateway receives outbound traffic from a device. For example, a device within the protected network may attempt to transmit a packet to a destination outside of the protected network. The packet may be intercepted by the gateway before it exits the protected network.

At 914, a determination is made as to whether the device sending the traffic has performed a DNS request to obtain the destination address included in the traffic. For example, the gateway can inspect the destination address of the packet and compare the destination address with a list of addresses provided to the gateway. The list of addresses may be provided to the gate way by a domain name server, for example, the domain name sever may be configured to implement example method 900 of FIG. 9A. In an example, the gateway can also inspect the source address of the packet and compare the source address with the list of device addresses provided to the gateway in order to determine if the device that is attempting to transmit the packet was also the device that performed a domain name lookup request.

At 916, the traffic allowed in response to the determination that a DNS request for the destination address was performed by the transmitting device. At 918, the traffic is blocked in response to the determination that a DNS request was not performed by the transmitting device for the destination address. In this manner, devices within the protected network may be required to perform a domain name lookup before communicating with an address outside of the protected network.

Figure 10:
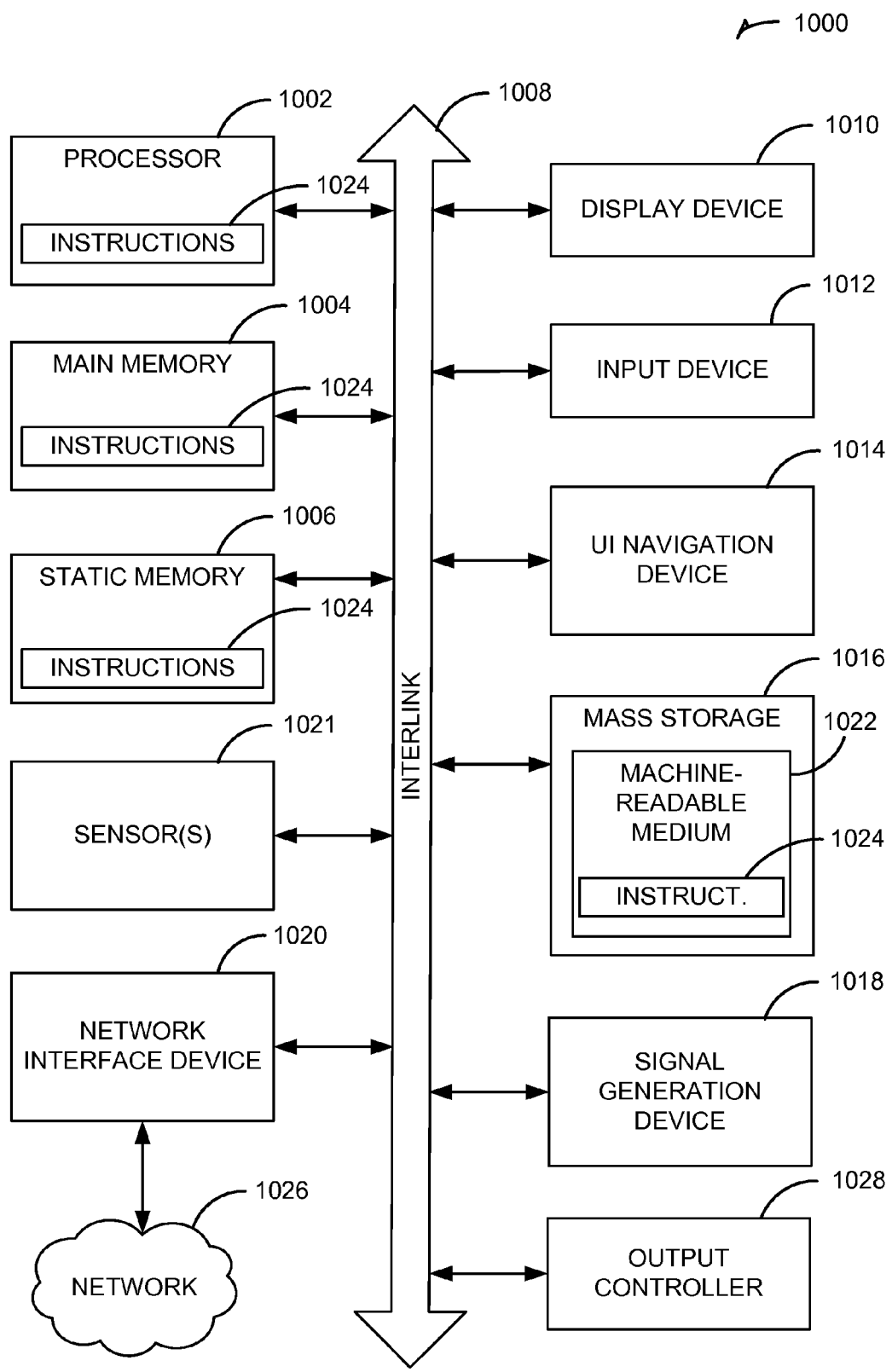
FIG. 10 is a block diagram illustrating an example machine upon which any one or more of the techniques discussed herein may be performed.

FIG. 10 is a block diagram illustrating an example machine 1000 upon which any one or more of the techniques (e.g., methodologies) discussed herein may be performed. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a processing unit, a graphics processing unit (GPU), a hardware processor core, or any combination thereof), a main memory 1004, and a static memory 1006, some or all of which may communicate with each other via an interlink 1008 (e.g., a bus, link, interconnect, or the like). The machine 1000 may further include a display device 1010, an input device 1012 (e.g., a keyboard), and a user interface (UI) navigation device 1014 (e.g., a mouse). In an example, the display device 1010, input device 1012, and UI navigation device 1014 may be a touch screen display. The machine 1000 may additionally include a mass storage (e.g., drive unit) 1016, a signal generation device 1018 (e.g., a speaker), a network interface device 1020, and one or more sensors 1021, such as a global positioning system (GPS) sensor, camera, video recorder, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The mass storage 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the mass storage 1016 may constitute machine readable media.

While the machine-readable medium 1022 is illustrated as a single medium, the term "machine readable medium" may include a single medium or multiple media (e.g., a centralized or distributed database, and/or associated caches and servers) that configured to store the one or more instructions 1024.

The term "machine-readable medium" may include any tangible medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

What is claimed is:

1. A method for protecting a network, the method comprising:
    blocking devices within the network, at a gateway, from accessing an external network;
    receiving, at a name server, a request from a device in the network for an address of a domain in the external network;
    creating an exception at the gateway, the exception allowing the device to access the address of the domain in the external network; and
    providing the client device with the address of the domain in response to the request.

2. The method of claim 1, further comprising: removing the exception at the gateway in response to a predetermined amount of time elapsing after the request; wherein removing the exception prevents the device from accessing the address of the domain in the external network.

3. The method of claim 1, further comprising:
    providing a source address of the device and the address of the domain to the gateway; wherein creating the exception at the gateway is based, at least in part, on the address of the domain and the source address of the device.

4. The method of claim 3, further comprising:
    storing the exception in a data store coupled to the name server and the gateway; wherein the name server provides an indication to the gateway upon creation of the exception.

5. The method of claim 2, wherein blocking devices within the network includes dropping packets that include an address of a domain in the external network that are not subject to the exception.

6. The method of claim 1, wherein the name server includes a domain name server (DNS) and the gateway includes a router, the DNS and the router being discrete devices coupled by a connection within the network.

7. The method of claim 6, wherein the address of the domain in the external network comprises an IP address including either an IPv4 or an IPv6 IP compatible address;
    the request includes a domain name server (DNS) lookup; and
    the DNS operates within the protected network.

8. A network protection system comprising:
    a gateway coupled to a protected network and an external network, the gateway configured to prevent a device in the protected network from accessing the external network; and
    a domain name server coupled to the network and the gateway, the domain name server configured to provide an external address to the device in the protected network in response to a domain name lookup request from the device, and to provide a notification to the gateway including an address of the device and the external address;

wherein the gateway is configured to create an exception allowing the device to access the external address.

9. The network protection system of claim 8, wherein the gateway and the domain name server are coupled by a network connection within the protected network.

10. The network protection system of claim 9, wherein the device is configured to submit domain name lookup requests to the domain name server, and the gateway is configured to prevent the device from accessing a name server other than the domain name server.

11. The network protection system of claim 9, wherein the gateway is a router, and the domain name server operates within the protected network.

12. The network protection system of claim 8, wherein the domain name server is configured to store the address of the device and the external address in a data store coupled to the domain name server and the gateway, and to provide an indication to the gateway upon the storage of the address of the device and the external address in a data store.

13. The network protection system of claim 8, further comprising:
   a second gateway coupled to the protected network and the external network, the second gateway configured to prevent the device in the protected network from accessing the external network;
   wherein the domain name server is coupled to the second gateway, the domain name server configured to provide the notification to the second gateway.

14. The network protection system of claim 8, further comprising:
   a second domain name server coupled to the network and the gateway, the second domain name server configured to provide an external address to the device in the protected network in response to a domain name lookup request from the device, and to provide a notification to the gateway including an address of the device and the external address.

15. A tangible machine-readable storage medium comprising instructions that when executed on a processor cause the processor to:
   block devices within the network, at a gateway, from accessing an external network;
   receive, at a name server, a request from a device in the network for an address of a domain in the external network;
   create an exception at the gateway, the exception allowing the device to access the address of the domain in the external network; and
   provide the client device with the address of the domain in response to the request.

16. The tangible machine-readable storage medium of claim 15, wherein the exception at the gateway expires after a predetermined amount of time has elapsed after the request.

17. The tangible machine-readable storage medium of claim 15, further comprising instructions that when executed on the processor cause the processor to:
   provide a source address of the device and the address of the domain to the gateway; wherein creating the exception at the gateway is based, at least in part, on the address of the domain and the source address of the device.

18. The tangible machine-readable storage medium of claim 17 further comprising instructions that when executed on the processor cause the processor to:
   store the exception in a data store coupled to the name server and the gateway; wherein the name server provides an indication to the gateway upon creation of the exception.

19. The tangible machine-readable storage medium of claim 15, wherein the name server includes a domain name server (DNS) and the gateway includes a router, the DNS and the router being discrete devices coupled by a connection within the network.

20. The tangible machine-readable storage medium of claim 19, wherein the address of the domain in the external network comprises an IP address including either an IPv4 or an IPv6 compatible IP address;
   the request includes a domain name server (DNS) lookup; and
   the DNS operates within the protected network.

* * * * *

UNITED STATES PATENT AND TRADEMARK OFFICE
CERTIFICATE OF CORRECTION

PATENT NO.       : 9,237,027 B2  
APPLICATION NO.  : 13/828546  
DATED            : January 12, 2016  
INVENTOR(S)      : Ellard et al.

Page 1 of 1

It is certified that error appears in the above-identified patent and that said Letters Patent is hereby corrected as shown below:

Specification

In column 3, line 25, delete "106." and insert --104.--, therefor

In column 7, line 26, delete "308." and insert --302.--, therefor

In column 10, line 31, after "any", insert --.--, therefor

Signed and Sealed this
Twenty-sixth Day of July, 2016

Michelle K. Lee
*Director of the United States Patent and Trademark Office*